US012784423B2

(12) United States Patent
Shi et al.

(10) Patent No.: US 12,784,423 B2
(45) Date of Patent: Nov. 3, 2026

(54) CAMERA POSE RELATIVE TO OVERHEAD IMAGE

(71) Applicants: Ford Global Technologies, LLC, Dearborn, MI (US); AUSTRALIAN NATIONAL UNIVERSITY, Acton (AU)

(72) Inventors: Yujiao Shi, Canberra (AU); Yanhao Zhang, Aranda (AU); Hongdong Li, Lyneham (AU); Akhil Perincherry, Dearborn, MI (US); Ankit Girish Vora, Northville, MI (US)

(73) Assignees: Ford Global Technologies, LLC, Dearborn, MI (US); Australian National University, Acton (AU)

( * ) Notice: Subject to any disclaimer, the term of this patent is extended or adjusted under 35 U.S.C. 154(b) by 267 days.

(21) Appl. No.: 18/625,463

(22) Filed: Apr. 3, 2024

(65) Prior Publication Data

US 2025/0316065 A1 Oct. 9, 2025

(51) Int. Cl.
*G06T 7/70* (2017.01)
*G06T 7/579* (2017.01)
(Continued)

(52) U.S. Cl.
CPC ............ *G06V 10/776* (2022.01); *G06T 7/579* (2017.01); *G06T 7/70* (2017.01); *G06V 10/7715* (2022.01);
(Continued)

(58) Field of Classification Search
CPC ............... G06V 10/776; G06V 10/772; G06V 10/7715; G06V 10/774; G06T 7/70–75;
(Continued)

(56) References Cited

U.S. PATENT DOCUMENTS

| | | | |
|---|---|---|---|
| 10,579,068 | B2 | 3/2020 | Madsen et al. |
| 11,269,346 | B2 | 3/2022 | Madsen et al. |

(Continued)

FOREIGN PATENT DOCUMENTS

| | | | |
|---|---|---|---|
| LU | 501005 | B1 | 12/2021 |

OTHER PUBLICATIONS

Shi et al Accurate 3-DoF Camera Geo-Localization via Ground-to-Satellite Image Matching IEEE 2022 (Year: 2022).*

(Continued)

*Primary Examiner* — Sean T Motsinger

(74) *Attorney, Agent, or Firm* — Frank A. MacKenzie; Brooks Kushman P.C.

(57) ABSTRACT

A computer includes a processor and a memory, and the memory stores instructions executable by the processor to generate an overhead feature map from an overhead image of a geographic area; generate an observed ground-view feature map from a ground-view image captured by a camera within the geographic area, the camera oriented at least partially horizontally while capturing the ground-view image; for each of a plurality of candidate poses of the camera, project the overhead feature map to a ground view defined by the respective candidate pose, resulting in a projected ground-view feature map for each candidate pose; for each projected ground-view feature map, determine a feature difference between the observed ground-view feature map and that projected ground-view feature map; and determine an estimated pose of the camera based on the feature differences.

19 Claims, 4 Drawing Sheets

(51) Int. Cl.
*G06V 10/77* (2022.01)
*G06V 10/772* (2022.01)
*G06V 10/774* (2022.01)
*G06V 10/776* (2022.01)
*G08G 1/0968* (2006.01)

(52) U.S. Cl.
CPC .......... *G06V 10/772* (2022.01); *G06V 10/774* (2022.01); *G08G 1/096816* (2013.01); *G06T 2207/10032* (2013.01); *G06T 2207/20081* (2013.01); *G06T 2207/30244* (2013.01)

(58) Field of Classification Search
CPC ........... G06T 7/579; G06T 2207/10032; G06T 2207/20081; G06T 2207/30244
See application file for complete search history.

(56) References Cited

U.S. PATENT DOCUMENTS

| | | | |
|---|---|---|---|
| 11,428,537 B2 | 8/2022 | Lavy et al. | |
| 2010/0176987 A1 | 7/2010 | Hoshizaki | |
| 2018/0061123 A1* | 3/2018 | Owechko | G06T 17/10 |
| 2021/0183080 A1* | 6/2021 | Hoiem | G06T 7/33 |
| 2022/0398825 A1 | 12/2022 | Gao et al. | |
| 2024/0199068 A1* | 6/2024 | Pavone | B60W 60/001 |
| 2025/0182325 A1* | 6/2025 | Guo | A61B 34/20 |

OTHER PUBLICATIONS

Shi et al Beyond Cross-view Image Retrieval: Highly Accurate Vehicle Localization Using Satellite Images Proceedings of the IEEE/CVF Conference on Computer Vision and Pattern Recognition (CVPR), 2022, pp. 17010-17020 (Year: 2022).*

Lentsch et al SliceMatch: Geometry-guided Aggregation for Cross-View Pose Estimation Proceedings of the IEEE/CVF Conference on Computer Vision and Pattern Recognition (CVPR), 2023, pp. 17225-17234 (Year: 2023).*

Yujiao Shi, Xin Yu, Dylan Campbell, Hongdong Li; Where Am I Looking At? Joint Location and Orientation Estimation by Cross-View Matching Proceedings of the IEEE/CVF Conference on Computer Vision and Pattern Recognition (CVPR), 2020, pp. 4064-4072 (Year: 2020).*

Chu, Hang, et al., “Accurate Vision-based Vehicle Localization using Satellite Imagery,” Recruit Researchers, Oct. 2015, 10 pages.

Gong, Z. et al., “Tightly Coupled Integration of GNSS and Vision SLAM Using 10-DoF Optimization on Manifold,” IEEE Sensors Journal, 2019, 13 pages.

* cited by examiner

300

CAMERA POSE RELATIVE TO OVERHEAD IMAGE

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems.

DETAILED DESCRIPTION

Figure 1:
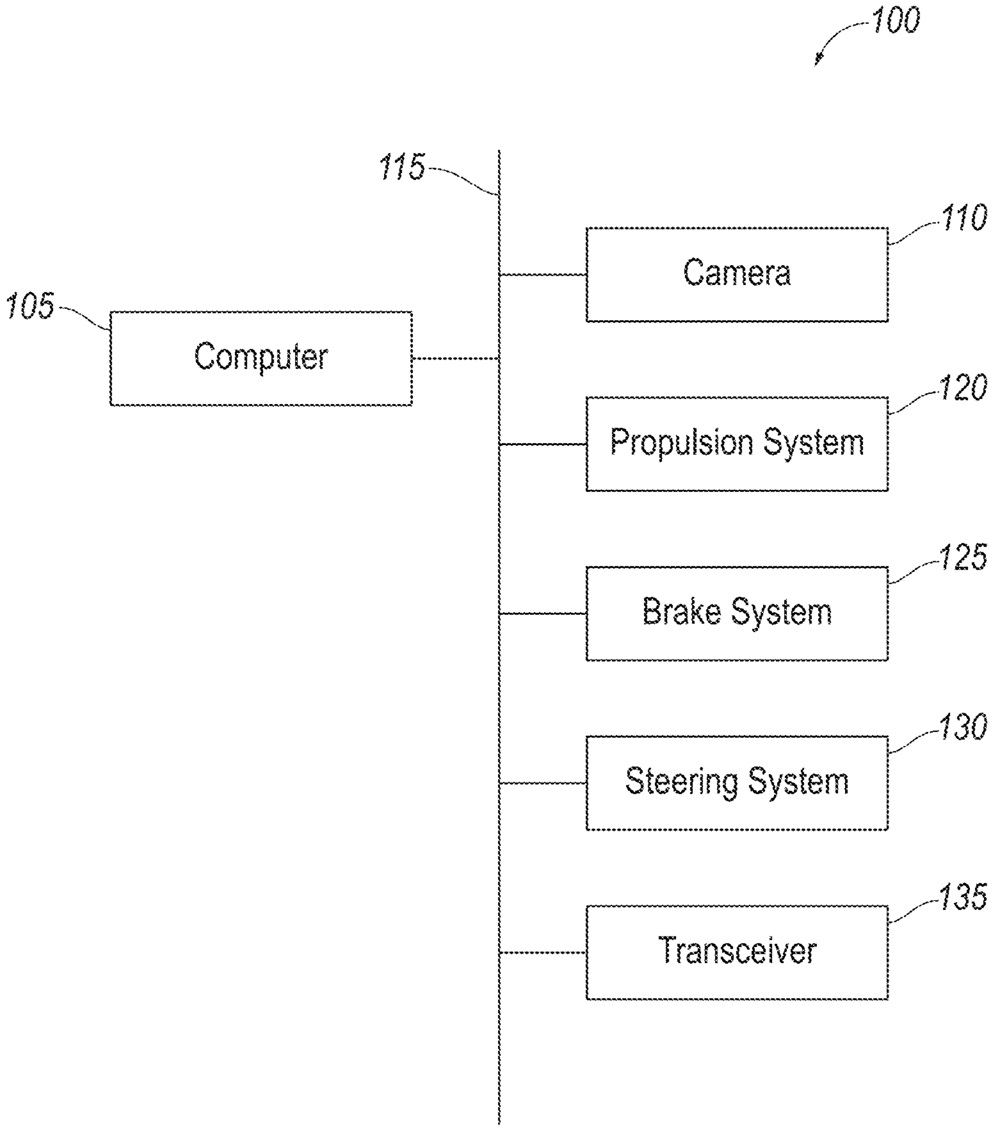
FIG. 1 is a block diagram of an example vehicle including a camera.

Vehicles sometimes use overhead images such as satellite images for operating in a geographic area depicted by the overhead images. This disclosure provides techniques for determining a pose of a camera in the geographic area, e.g., a camera mounted on a vehicle, with respect to an overhead image of the geographic area. The pose may include two spatial coordinates and a heading. The techniques herein can provide a pose with a very high accuracy, e.g., better than the use of simultaneous localization and mapping (SLAM) techniques.

A computer of a vehicle may be programmed to receive or access the overhead image of the geographic area, receive a ground-view image captured by the camera while oriented horizontally, generate an overhead feature map from the overhead image, and generate an observed ground-view feature map from the ground-view image. The computer may receive or select a plurality of candidate poses, i.e., possible poses of the camera. For each candidate pose, the computer projects the overhead feature map to a ground view defined by the respective candidate pose, resulting in a projected ground-view feature map for the respective candidate pose; and then determines a feature difference between the observed ground-view feature map and that projected ground-view feature map. Further, the computer determines an estimated pose of the camera based on the feature differences. The use of multiple candidate poses permits the computer to test the accuracy of the projected ground-view feature maps across a portion of the overhead image to find an estimated pose that minimizes the feature differences, thereby increasing the accuracy of the estimated pose.

A computer includes a processor and a memory, and the memory stores instructions executable by the processor to generate an overhead feature map from an overhead image of a geographic area; generate an observed ground-view feature map from a ground-view image captured by a camera within the geographic area, the camera oriented at least partially horizontally while capturing the ground-view image; for each of a plurality of candidate poses of the camera, project the overhead feature map to a ground view defined by the respective candidate pose, resulting in a projected ground-view feature map for each candidate pose; for each projected ground-view feature map, determine a feature difference between the observed ground-view feature map and that projected ground-view feature map; and determine an estimated pose of the camera based on the feature differences.

In an example, the instructions may further include instructions to actuate at least one of a propulsion system, a brake system, or a steering system of a vehicle based on the estimated pose, the vehicle including the camera.

In an example, each feature difference may be based on a subtraction operation between the respective projected ground-view feature map and the observed ground-view feature map.

In an example, the instructions may further include instructions to select the candidate poses from a location probability map indicating relative probabilities that the camera is located at a plurality of locations in the geographic area. In a further example, the instructions may further include instructions to select a preset number of locations having the greatest relative probabilities from the location probability map as the candidate poses.

In an example, the instructions may further include instructions to determine the estimated pose as a weighted average of the candidate poses, with weights for the candidate poses based on the feature differences. In a further example, the instructions may further include instructions to determine the weight for each candidate pose based on the feature differences, with the weight for each candidate pose being greater as the feature difference for the respective candidate pose is smaller.

In another further example, the instructions may further include instructions to determine the weights for the candidate poses by executing a machine-learning algorithm taking the feature differences as inputs. In a yet further example, the instructions may further include instructions to, for each candidate pose, execute the machine-learning algorithm with inputs including the feature difference for the respective candidate pose, a maximum of the feature differences, and a minimum of the feature differences.

In another yet further example, the machine-learning algorithm may output a score for each candidate pose, the weights being a softmax of the scores.

In an example, the instructions may further include instructions to, before determining the feature differences, normalize the observed ground-view feature map by a measure of total illumination in the observed ground-view feature map.

In an example, the instructions may further include instructions to, before determining the feature difference for each candidate pose, normalize the projected ground-view feature map for the respective candidate pose by a measure of total illumination in that projected ground-view feature map.

In an example, the candidate poses may include a first candidate pose, and the instructions may further include instructions to determine the first candidate pose by executing an algorithm for simultaneous localization and mapping (SLAM). In a further example, the candidate poses may consist of the first candidate pose and a plurality of second candidate poses, and the instructions may further include instructions to select the second candidate poses from a location probability map indicating relative probabilities that the camera is located at a plurality of locations in the geographic area.

A method includes generating an overhead feature map from an overhead image of a geographic area; generating an observed ground-view feature map from a ground-view image captured by a camera within the geographic area, the camera oriented at least partially horizontally while capturing the ground-view image; for each of a plurality of candidate poses of the camera, projecting the overhead feature map to a ground view defined by the respective candidate pose, resulting in a projected ground-view feature map for each candidate pose; for each projected ground-view feature map, determining a feature difference between the observed ground-view feature map and that projected ground-view feature map; and determining an estimated pose of the camera based on the feature differences.

In an example, the method may further include determining the estimated pose as a weighted average of the candidate poses, with weights for the candidate poses based on the feature differences. In a further example, the method may further include determining the weight for each candidate pose based on the feature differences, with the weight for each candidate pose being greater as the feature difference for the respective candidate pose is smaller.

In another further example, the method may further include determining the weights for the candidate poses by executing a machine-learning algorithm taking the feature differences as inputs. In a yet further example, the method may further include, for each candidate pose, executing the machine-learning algorithm with inputs including the feature difference for the respective candidate pose, a maximum of the feature differences, and a minimum of the feature differences.

In another yet further example, the machine-learning algorithm may output a score for each candidate pose, the weights being a softmax of the scores.

With reference to the Figures, wherein like numerals indicate like parts throughout the several views, a computer 105 includes a processor and a memory, and the memory stores instructions executable by the processor to generate an overhead feature map 205 from an overhead image 210 of a geographic area; generate an observed ground-view feature map 215 from a ground-view image 220 captured by a camera 110 within the geographic area, the camera 110 oriented at least partially horizontally while capturing the ground-view image 220; for each of a plurality of candidate poses of the camera 110, project the overhead feature map 205 to a ground view defined by the respective candidate pose, resulting in a projected ground-view feature map 225 for each candidate pose; for each projected ground-view feature map 225, determine a feature difference 230 between the observed ground-view feature map 215 and that projected ground-view feature map 225; and determine an estimated pose of the camera 110 based on the feature differences 230.

With reference to FIG. 1, the vehicle 100 may be any passenger or commercial automobile such as a car, a truck, a sport utility vehicle, a crossover, a van, a minivan, a taxi, a bus, etc. The vehicle 100 may include the computer 105, a communications network 115, the camera 110, a propulsion system 120, a brake system 125, a steering system 130, and a transceiver 135.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 115. The communications network 115 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the camera 110, the propulsion system 120, the brake system 125, the steering system 130, the transceiver 135, and other components via the communications network 115.

The camera 110 can detect electromagnetic radiation in some range of wavelengths. For example, the camera 110 may detect visible light, infrared radiation, ultraviolet light, or some range of wavelengths including visible, infrared, and/or ultraviolet light. For example, the camera 110 can be a charge-coupled device (CCD), complementary metal oxide semiconductor (CMOS), or any other suitable type. The camera 110 may be fixed relative to the vehicle 100, e.g., fixedly mounted to a body of the vehicle 100. The camera 110 is oriented at least partially horizontally, e.g., may have a tilt angle and a roll angle relative to the vehicle 100 that are close to zero. For example, a center of a field of view of the camera 110 may be closer to horizontal than to vertical, e.g., may be tilted slightly downward from horizontal.

The propulsion system 120 of the vehicle 100 generates energy and translates the energy into motion of the vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the vehicle 100 to thereby slow and/or stop the vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

The transceiver 135 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 135 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 135 may be one device or may include a separate transmitter and receiver.

Figure 2:
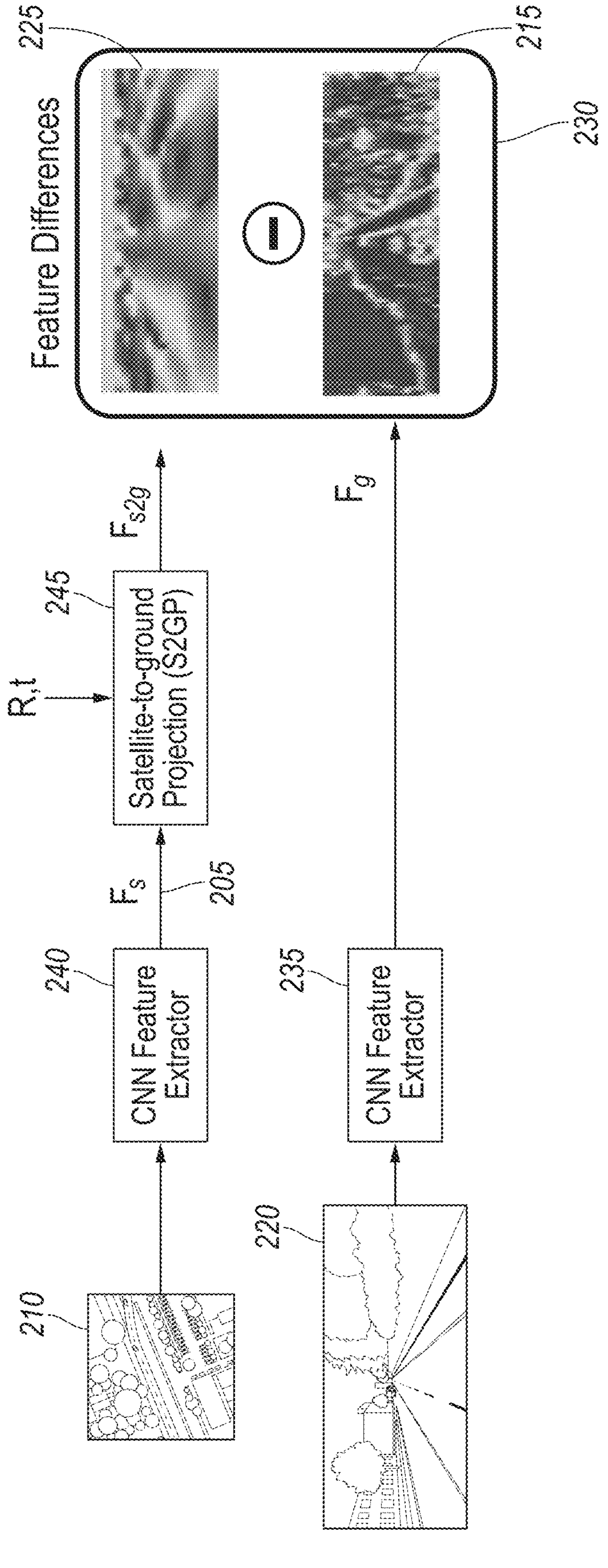
FIG. 2 is a diagram of an example machine-learning architecture for determining a feature difference between an observed ground-view feature map and a projected ground-view feature map.

With reference to FIG. 2, the determination of the estimated pose below is based on an overhead image 210. The overhead image 210 is an image of the geographic area obtained by a sensor external to the vehicle 100, e.g., a camera above the ground. The sensor is unattached to the vehicle 100 and spaced from the vehicle 100. To capture the overhead image 210 of the geographic area, the sensor, e.g., camera, may be mounted to a satellite, aircraft, helicopter, unmanned aerial vehicles (or drones), balloon, stand-alone pole, a ceiling of a building, etc. In particular, the overhead image 210 may be a satellite image, i.e., an image captured from a sensor on board a satellite.

The overhead image 210 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in the overhead image 210, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the overhead image 210.

The computer 105 is programmed to receive the overhead image 210 of the geographic area. For example, the computer 105 may receive the overhead image 210 via the transceiver 135 from a remote server. For another example, the overhead image 210 may be stored in the memory of the computer 105, and the computer 105 may receive the overhead image 210 from the memory. The computer 105 may request the overhead image 210 from the remote server or from memory based on a location of the vehicle 100, e.g., from a global positioning system (GPS) sensor, in order that the overhead image 210 covers the geographic area through which the vehicle 100 is traveling. The location of the vehicle 100 may be less accurate than the estimated pose determined below.

The determination of the estimated pose below is further based on the ground-view image 220. The computer 105 is programmed to receive the ground-view image 220, e.g., from the camera 110 over the communications network 115. The ground-view image 220 is captured by the camera 110 within the geographic area, i.e., within the area represented in the overhead image 210. The camera 110 is oriented at least partially horizontally while capturing the ground-view image 220, e.g., by being fixed to the vehicle 100 in a partially horizontal orientation as described above. The ground-view image 220 is a two-dimensional matrix of pixels, as described above for the overhead image 210, although the ground-view image 220 may be a different pixel size than the overhead image 210.

Figure 3:
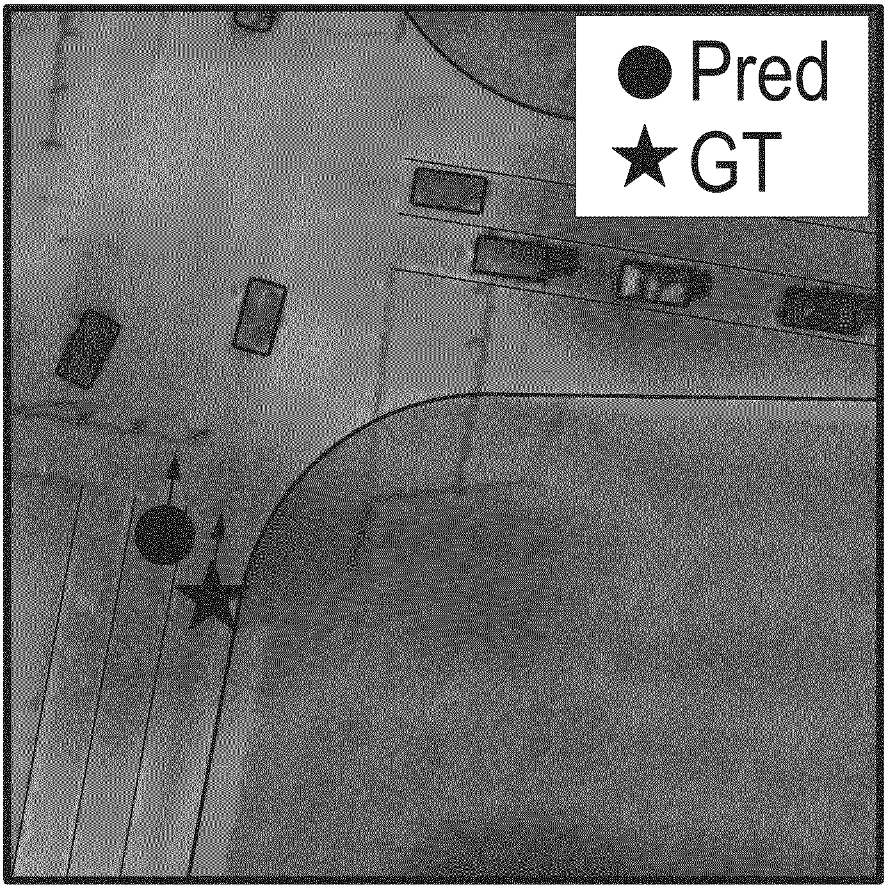
FIG. 3 is an example location probability map.

With reference to FIG. 3, a location probability map 300 indicates relative probabilities that the camera 110 is located at a plurality of locations in the geographic area. The locations may be specified with respect to the overhead image 210. For example, FIG. 3 shows locations with higher probabilities with darker shading, superimposed on an overhead image 210. Each of the plurality of locations may have a confidence value associated with that location, the confidence value indicating a relative probability that the camera 110 is at that location.

The computer 105 may be programmed to generate the location probability map 300. For example, the computer 105 may generate the location probability map 300 based on the overhead image 210 and the ground-view image 220. The computer 105 may generate the location probability map 300 based on the overhead image 210 and the ground-view image 220 as described in U.S. patent application Ser. No. 18/190,194, hereby incorporated in its entirety. Alternatively, the computer 105 may perform a different algorithm for generating the location probability map 300, as is known in the art.

The determination of the estimated pose below is performed using a plurality of candidate poses, i.e., possible poses of the camera 110. The candidate poses (as well as the estimated pose) may each include a location and an orientation, e.g., a two-dimensional horizontal location and a heading or yaw. The candidate poses and estimated pose may be each represented as a vector of spatial and angular coordinates or equivalently with translation and rotation matrices. The candidate poses may include, e.g., may consist of, a first candidate pose derived from a SLAM algorithm and a plurality of second candidate poses derived from the location probability map 300. The number of second candidate poses may be a preset discrete number, e.g., ten (making the number of candidate poses eleven), and/or the candidate poses may be limited to the first candidate pose and the second candidate poses, in order to make the determination feasible to compute.

The computer 105 may determine the first candidate pose by executing an algorithm for simultaneous localization and mapping (SLAM). As is known, SLAM is a process of generating and/or updating a map of an environment while simultaneously tracking an entity's location within the environment. The computer 105 may use any suitable SLAM or visual SLAM algorithm, e.g., particle filter, extended Kalman filter, covariance intersection, graphSLAM, etc., as are known.

The computer 105 may select the second candidate poses from the location probability map 300. For example, the computer 105 may select the preset number of locations having the greatest relative probabilities from the location probability map 300 as the second candidate poses.

Returning to FIG. 2, the computer 105 is programmed to generate the observed ground-view feature map 215 from the ground-view image 220. Generating the observed ground-view feature map 215 includes executing a first feature extractor 235. The first feature extractor 235 may include one or more suitable techniques for feature extraction, e.g., low-level techniques such as edge detection, corner detection, blob detection, ridge detection, scale-invariant feature transform (SIFT), etc.; shape-based techniques such as thresholding, blob extraction, template matching, Hough transform, generalized Hough transform, etc.; flexible methods such as deformable parameterized shapes, active contours, etc.; etc. The first feature extractor 235 may include machine-learning operations. For example, the first feature extractor 235 may include residual network (ResNet) layers followed by a convolutional neural network.

The observed ground-view feature map 215 includes a plurality of features. For the purposes of this disclosure, the term "feature" is used in its computer-vision sense as a piece of information about the content of an image, specifically about whether a certain region of the image has certain properties. Types of features may include edges, corners, blobs, etc. The observed ground-view feature map 215 provides locations in the ground-view image 220, e.g., in pixel coordinates, of the features. The observed ground-view feature map 215 has a reduced dimensionality compared to the ground-view image 220. The observed ground-view feature map 215 may be a feature pyramid, i.e., include a plurality of individual feature maps of different dimensionalities, i.e., levels, e.g., different downscaling factors from the ground-view image 220.

The computer 105 is programmed to generate the overhead feature map 205 from the overhead image 210 of the geographic area. Generating the overhead feature map 205 includes executing a second feature extractor 240. The second feature extractor 240 may include one or more suitable techniques for feature extraction, e.g., low-level techniques such as edge detection, corner detection, blob detection, ridge detection, scale-invariant feature transform (SIFT), etc.; shape-based techniques such as thresholding, blob extraction, template matching, Hough transform, generalized Hough transform, etc.; flexible methods such as deformable parameterized shapes, active contours, etc.; etc. The second feature extractor 240 may include machine-learning operations. For example, the second feature extractor 240 may include residual network (ResNet) layers followed by a convolutional neural network.

The overhead feature map 205 includes a plurality of features. The overhead feature map 205 provides locations in the overhead image 210, e.g., in pixel coordinates, of the features. The observed overhead feature map 205 has a same or reduced dimensionality compared to the overhead image 210. The observed overhead feature map 205 may be a feature pyramid.

The computer 105 is programmed to, for each candidate pose, project the overhead feature map 205 to a ground view defined by the respective candidate pose, resulting in a projected ground-view feature map 225 for each candidate pose. The computer 105 may project the overhead feature map 205 to each ground view based on a geometric relationship 245. For example, the geometric relationship 245 may be a homography between a ground plane and an image plane of the camera 110. The ground plane may be a flat surface representing the ground in the geographic area. The term "homography" is used herein in the projective geometry sense of an isomorphism between projective spaces, in this case the projective space of the ground plane and the projective space of the image plane of the camera 110.

Each projected ground-view feature map 225 includes a plurality of features, specifically, the same features as the overhead feature map 205 but with locations adjusted according to the geometric relationship 245. Each projected ground-view feature map 225 provides locations in the image plane of the camera 110, e.g., in pixel coordinates, of the features. Thus, each projected ground-view feature map 225 provides locations in a ground-view image 220 that would be produced by the camera 110 if the camera 110 were positioned at the respective candidate pose. Each projected ground-view feature map 225 may be a feature pyramid.

The computer 105 may be programmed to normalize the observed ground-view feature map 215 and the projected ground-view feature map 225. The computer 105 may normalize the observed ground-view feature map 215 by a measure of total illumination in the observed ground-view feature map 215, e.g., by the square root of the sum of the squares of the feature values across the observed ground-view feature map 215, as in the following expression:

$$F_g(h, w, c) \leftarrow \frac{F_g(h, w, c)}{\sqrt{\sum_h \sum_w F_g(h, w, c)^2}}$$

in which $F_g$ is a matrix of the observed ground-view feature map 215, h is an index of the height of the observed ground-view feature map 215, w is an index of the width of the observed ground-view feature map 215, and c is an index of the channel of the observed ground-view feature map 215. The channels may be defined by, e.g., color, or by some other qualitative feature. The computer 105 may normalize the projected ground-view feature map 225 for each candidate pose by a measure of total illumination in that projected ground-view feature map 225, e.g., by the square root of the sum of the squares of the feature values across that projected ground-view feature map 225, as in the following expression:

$$F_{s2g,k}(h, w, c) \leftarrow \frac{F_{s2g,k}(h, w, c)}{\sqrt{\sum_h \sum_w F_{s2g,k}(h, w, c)^2}}$$

in which k is an index of the candidate poses, $F_{s2g,k}$ is a matrix of the kth projected ground-view feature map 225, h is an index of the height of the projected ground-view feature map 225, w is an index of the width of the projected ground-view feature map 225, and c is an index of the channel of the projected ground-view feature map 225. In other words, the computer 105 is scaling the matrices $F_g$, $F_{s2g,k}$ by the total illumination in the respective feature maps 215, 225. The computer 105 may perform the normalizations before determining the feature differences 230 (described below) so that the brightness of the feature maps 215, 225 does not affect the feature differences 230.

The computer 105 is programmed to, for each projected ground-view feature map 225, determine a feature difference 230 between the observed ground-view feature map 215 and that projected ground-view feature map 225. The feature difference 230 for a projected ground-view feature map 225 is a measure of how well the features in that projected ground-view feature map 225 match the features of the observed ground-view feature map 215, i.e., match the actual features as observed in the ground-view image 220. The feature difference 230 is thereby a measure of the accuracy of the candidate pose from which the projected ground-view feature map 225 was generated. The feature difference 230 may be computed separately for each channel (e.g., color), making it a function of the channel. Each feature difference 230 may be based on a subtraction operation between the respective projected ground-view feature map 225 and the observed ground-view feature map 215, e.g., as an L2 loss between the respective projected ground-view feature map 225 and the observed ground-view feature map 215, as in the following expression:

$$F_{diff,k}(c) = \|F_{s2g,k}(:, :, c) - F_g(:, :, c)\|_2^2$$

in which $F_{diff,k}$ is the feature difference 230 for the kth projected ground-view feature map 225, i.e., for the kth candidate pose.

The first feature extractor 235 and second feature extractor 240 may be trained using the feature differences 230. For example, the training may use a loss function that penalizes deviations of the feature differences 230 for the candidate poses from the feature difference 230 of the ground-truth location, e.g., as in the following expression:

$$\mathcal{L} = \log\left(1 + e^{\left(mean\left(F^*_{diff}\right) - mean\left(F_{diff,k}\right)\right)}\right)$$

in which $\mathcal{L}$ is the loss value and $$F^*_{diff}$$

is the feature difference 230 for the ground-truth location.

To determine the estimated pose (described below), the computer 105 may be programmed to determine a weight for each candidate pose based on the feature differences 230. The weight for each candidate pose may be greater as the feature difference 230 for the respective candidate pose is smaller, i.e., $w_k$ increases as $F_{diff,k}$ decreases, and vice versa. As a general overview, the computer 105 may determine the weights by executing a machine-learning algorithm on the feature differences 230 that outputs a score for each candidate pose, and then determining the weights as a softmax of the scores, as will be described in turn.

The computer 105 may execute a machine-learning algorithm taking the feature differences 230 as inputs. The machine-learning algorithm outputs a score for each candidate pose. Each score indicates a confidence or relative likelihood of the respective candidate pose being the actual pose of the camera 110. The computer 105 may, for each candidate pose, execute the machine-learning algorithm with inputs including the feature difference 230 for the respective candidate pose, a maximum of the feature differences 230, and a minimum of the feature differences 230, e.g., concatenated together as in the following expression:

$$\left[F_{diff,k} \ \min_i F_{diff,i} \ \max_j F_{diff,j}\right]$$

in which k is the index of the candidate pose of interest, i is an index of the candidate pose having the minimum of the feature differences 230, and j is an index of the candidate pose having the maximum of the feature differences 230. The maximum and minimum feature differences 230 may provide contextualization for the machine-learning program to output a more accurate score. The machine-learning algorithm may be, e.g., a multilayer perceptron, i.e., a feedforward artificial neural network (ANN) that is fully connected.

The computer 105 may determine the weights by taking a softmax of the scores from the machine-learning algorithm. The softmax function converts a vector of K real numbers to a probability distribution over K possible outcomes, e.g., as in the following expression:

$$w_k = softmax(s_k)$$

in which $w_k$ is the kth weight and $s_k$ is the kth score. As a result of the softmax function, the sum of the weights is 1.

The computer 105 is programmed to determine the estimated pose of the camera 110 based on the feature differences 230, e.g., based on the weights computed from the feature differences 230. The computer 105 may determine the estimated pose as a weighted average of the candidate poses, as in the following expression:

$$t = \sum_k w_k t_k$$

in which t is the estimated pose and $t_k$ is the kth candidate pose.

The machine-learning algorithm for determining the scores may be trained using the estimated pose. For example, the training may use a loss function that penalizes deviations of the estimated pose from the ground-truth pose, e.g., L1 or L2 loss between the estimated pose t and the ground-truth pose t*.

The computer 105 may be programmed to actuate a component of the vehicle 100 based on the estimated pose of the camera 110. The computer 105 may determine an estimated pose of the vehicle 100 based on the estimated pose of the camera 110 according to a known, fixed geometric relationship between the camera 110 and a reference point of the vehicle 100. The component may include, e.g., the propulsion system 120, the brake system 125, and/or the steering system 130. For example, the computer 105 may actuate at least one of the propulsion system 120, the brake system 125, or the steering system 130. For example, the computer 105 may actuate the steering system 130 based on the distances to lane boundaries as part of a lane-centering feature, e.g., steering to assist the operator of the vehicle 100 from traveling too close to the lane boundaries. The computer 105 may identify the lane boundaries using the overhead image 210 and/or sensors of the vehicle 100 such as the camera 110. The computer 105 may, if the location of the vehicle 100 is within a distance threshold of one of the lane boundaries, instruct the steering system 130 to actuate to steer the vehicle 100 toward the center of the lane. For another example, the computer 105 may operate the vehicle 100, i.e., actuating the propulsion system 120, the brake system 125, and the steering system 130 based on the estimated pose, e.g., to navigate the vehicle 100 through the geographic area.

Figure 4:
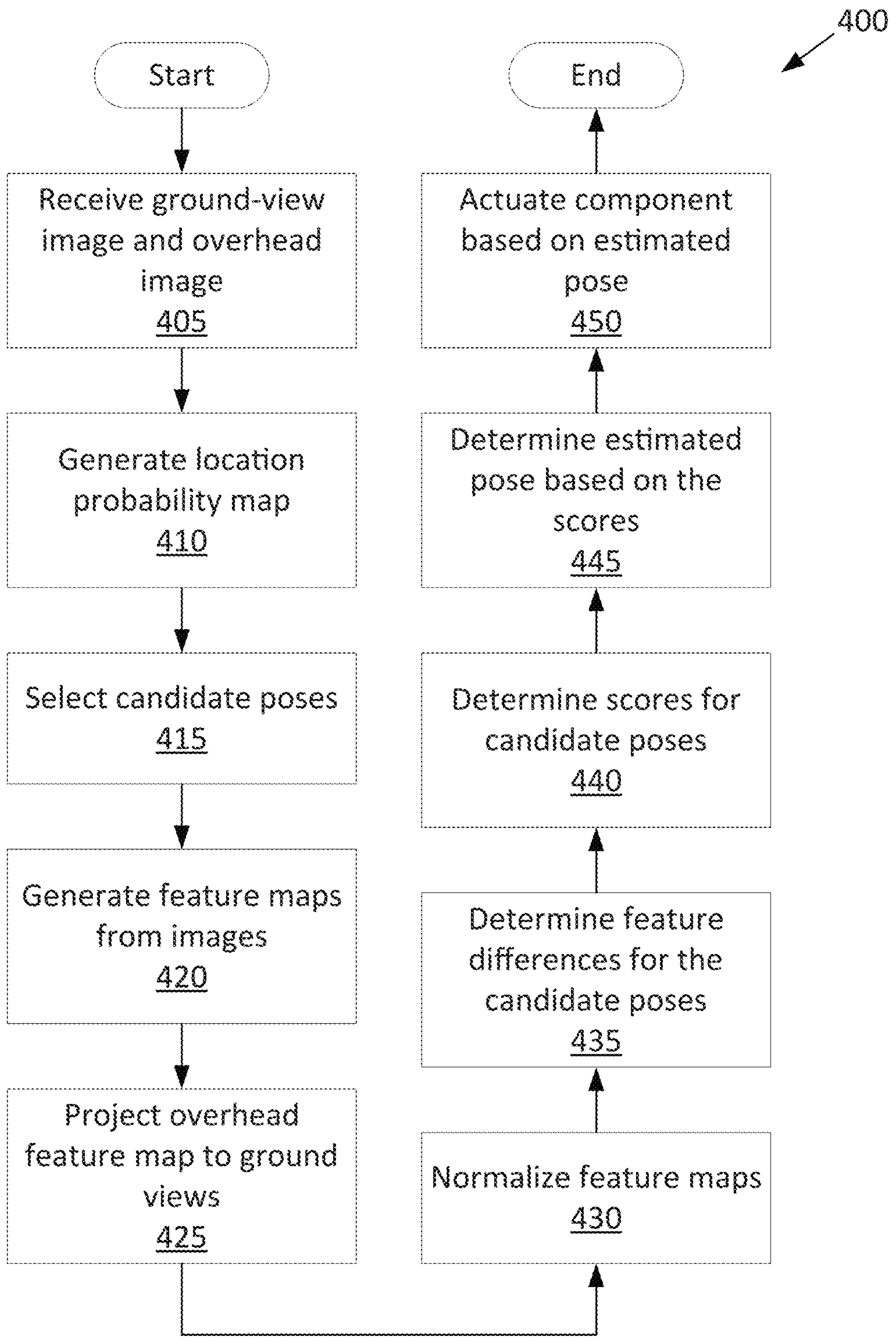
FIG. 4 is a flowchart of an example process for determining an estimated pose of the camera.

FIG. 4 is a flowchart illustrating an example process 400 for determining the estimated pose of the camera 110. The memory of the computer 105 stores executable instructions for performing the steps of the process 400 and/or programming can be implemented in structures such as mentioned above. As a general overview of the process 400, the computer 105 receives the ground-view image 220 and the overhead image 210, generates the location probability map 300, selects the candidate poses for the camera 110, generates the overhead feature map 205 and the observed ground-view feature map 215, projects the overhead feature map 205 into the projected ground-view feature maps 225, normalizes the observed ground-view feature map 215 and the projected ground-view feature maps 225, determines the feature differences 230 between the projected ground-view feature maps 225 and the observed ground-view feature map 215, determines the scores for the candidate poses, determines the estimated pose based on the scores, and actuates a component of the vehicle 100 based on the estimated pose.

The process 400 begins in a block 405, in which the computer 105 receives the ground-view image 220 and the overhead image 210, as described above.

Next, in a block 410, the computer 105 generates the location probability map 300, as described above.

Next, in a block 415, the computer 105 determines the first candidate pose from a SLAM algorithm and selects the second candidate poses from the location probability map 300, as described above.

Next, in a block 420, the computer 105 generates the observed ground-view feature map 215 from the ground-view image 220 and the overhead feature map 205 from the overhead image 210, as described above.

Next, in a block 425, for each candidate pose from the block 415, the computer 105 projects the overhead feature map 205 from the block 420 to a ground view defined by the respective candidate pose, resulting in a projected ground-view feature map 225 for each candidate pose.

Next, in a block 430, the computer 105 normalizes the observed ground-view feature map 215 by a measure of total illumination in the observed ground-view feature map 215, and the computer 105 normalizes each projected ground-view feature map 225 by a measure of total illumination in that projected ground-view feature map 225, as described above.

Next, in a block 435, for each projected ground-view feature map 225, the computer 105 determines a feature difference 230 between the observed ground-view feature map 215 and that projected ground-view feature map 225, as described above.

Next, in a block 440, the computer 105 determines the scores for the respective candidate poses based on the feature differences 230, as described above.

Next, in a block 445, the computer 105 determines the estimated pose of the camera 110 based on the feature differences 230, e.g., based on the scores and the candidate poses, as described above.

Next, in a block 450, the computer 105 actuates a component of the vehicle 100, e.g., at least one of a propulsion system 120, a brake system 125, or a steering system 130, based on the estimated pose, as described above. After the block 450, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

generate an overhead feature map from an overhead image of a geographic area;

generate an observed ground-view feature map from a ground-view image captured by a camera within the geographic area, the camera oriented at least partially horizontally while capturing the ground-view image;

for each of a plurality of candidate poses of the camera, project the overhead feature map to a ground view defined by the respective candidate pose, resulting in a projected ground-view feature map for each candidate pose;

for each projected ground-view feature map, determine a feature difference between the observed ground-view feature map and that projected ground-view feature map;

determine an estimated pose of the camera based on the feature differences by determining the estimated pose as a weighted average of the candidate poses, with weights for the candidate poses based on the feature differences; and actuate at least one of a propulsion system, a brake system, or a steering system of a vehicle based on the estimated pose, the vehicle including the camera.

2. The computer of claim 1, wherein each feature difference is based on a subtraction operation between the respective projected ground-view feature map and the observed ground-view feature map.

3. The computer of claim 1, wherein the instructions further include instructions to select the candidate poses from a location probability map indicating relative probabilities that the camera is located at a plurality of locations in the geographic area.

4. The computer of claim 3, wherein the instructions further include instructions to select a preset number of locations having the greatest relative probabilities from the location probability map as the candidate poses.

5. The computer of claim 1, wherein the instructions further include instructions to determine the weight for each candidate pose based on the feature differences, with the weight for each candidate pose being greater as the feature difference for the respective candidate pose is smaller.

6. The computer of claim 1, wherein the instructions further include instructions to determine the weights for the candidate poses by executing a machine-learning algorithm taking the feature differences as inputs.

7. The computer of claim 6, wherein the instructions further include instructions to, for each candidate pose, execute the machine-learning algorithm with inputs including the feature difference for the respective candidate pose, a maximum of the feature differences, and a minimum of the feature differences.

8. The computer of claim 6, wherein the machine-learning algorithm outputs a score for each candidate pose, the weights being a softmax of the scores.

9. The computer of claim 1, wherein the instructions further include instructions to, before determining the feature differences, normalize the observed ground-view feature map by a measure of total illumination in the observed ground-view feature map.

10. The computer of claim 1, wherein the instructions further include instructions to, before determining the feature difference for each candidate pose, normalize the projected ground-view feature map for the respective candidate pose by a measure of total illumination in that projected ground-view feature map.

11. The computer of claim 1, wherein the candidate poses include a first candidate pose, and the instructions further include instructions to determine the first candidate pose by executing an algorithm for simultaneous localization and mapping (SLAM).

12. The computer of claim 11, wherein the candidate poses consist of the first candidate pose and a plurality of second candidate poses, and the instructions further include instructions to select the second candidate poses from a location probability map indicating relative probabilities that the camera is located at a plurality of locations in the geographic area.

13. A method comprising:

generating an overhead feature map from an overhead image of a geographic area;

generating an observed ground-view feature map from a ground-view image captured by a camera within the geographic area, the camera oriented at least partially horizontally while capturing the ground-view image;

for each of a plurality of candidate poses of the camera, projecting the overhead feature map to a ground view defined by the respective candidate pose, resulting in a projected ground-view feature map for each candidate pose;

for each projected ground-view feature map, determining a feature difference between the observed ground-view feature map and that projected ground-view feature map;

determining an estimated pose of the camera based on the feature differences by determining the estimated pose as a weighted average of the candidate poses, with weights for the candidate poses based on the feature differences; and actuating at least one of a propulsion system, a brake system, or a steering system of a vehicle based on the estimated pose, the vehicle including the camera.

14. The method of claim 13, further comprising determining the weight for each candidate pose based on the feature differences, with the weight for each candidate pose being greater as the feature difference for the respective candidate pose is smaller.

15. The method of claim 13, further comprising determining the weights for the candidate poses by executing a machine-learning algorithm taking the feature differences as inputs.

16. The method of claim 15, further comprising, for each candidate pose, executing the machine-learning algorithm with inputs including the feature difference for the respective candidate pose, a maximum of the feature differences, and a minimum of the feature differences.

17. The method of claim 15, wherein the machine-learning algorithm outputs a score for each candidate pose, the weights being a softmax of the scores.

18. A computer comprising a processor and a memory, the memory storing instructions executable by the processor to:

generate an overhead feature map from an overhead image of a geographic area;

generate an observed ground-view feature map from a ground-view image captured by a camera within the geographic area, the camera oriented at least partially horizontally while capturing the ground-view image;

select a plurality of candidate poses of the camera from a location probability map indicating relative probabilities that the camera is located at a plurality of locations in the geographic area;

for each of the candidate poses of the camera, project the overhead feature map to a ground view defined by the respective candidate pose, resulting in a projected ground-view feature map for each candidate pose;

for each projected ground-view feature map, determine a feature difference between the observed ground-view feature map and that projected ground-view feature map;

determine an estimated pose of the camera based on the feature differences; and actuate at least one of a propulsion system, a brake system, or a steering system of a vehicle based on the estimated pose, the vehicle including the camera.

19. The computer of claim 18, wherein the instructions further include instructions to select a preset number of locations having the greatest relative probabilities from the location probability map as the candidate poses.

* * * * *